US006631938B1

United States Patent
Burns

(10) Patent No.: US 6,631,938 B1
(45) Date of Patent: Oct. 14, 2003

(54) RETRACTABLE TAILGATE BENCH

(76) Inventor: William Burns, 20071 Clark Ave., Orange, CA (US) 92869

( * ) Notice: Subject to any disclaimer, the term of this patent is extended or adjusted under 35 U.S.C. 154(b) by 0 days.

(21) Appl. No.: 10/157,627

(22) Filed: May 28, 2002

(51) Int. Cl.$^7$ .............................. B60N 2/10; B60N 2/30
(52) U.S. Cl. .................. 296/64; 296/65.01; 296/65.05; 296/65.16; 297/14
(58) Field of Search .............................. 296/57.1, 65.01, 296/65.05, 65.09, 65.16, 63, 64, 68, 69; 297/14, 217.1, 217.7, 411.32

(56) References Cited

U.S. PATENT DOCUMENTS

| 324,196 | A | * | 8/1885 | Walling | 296/68 |
| 4,846,487 | A | * | 7/1989 | Criley | 296/62 |
| 5,028,063 | A | * | 7/1991 | Andrews | 296/62 |
| 5,215,346 | A | * | 6/1993 | Reitzloff et al. | 296/51 |
| 5,533,774 | A | * | 7/1996 | Cavanaugh | 296/66 |
| 5,549,312 | A | * | 8/1996 | Garvert | 296/62 |
| 5,590,925 | A | * | 1/1997 | Banks, Sr. | 296/24.1 |
| 5,788,311 | A | * | 8/1998 | Tibbals | 296/62 |
| 5,816,638 | A | * | 10/1998 | Pool, III | 296/26.11 |
| 6,089,651 | A | * | 7/2000 | Carmen | 297/16.1 |
| 6,203,108 | B1 | * | 3/2001 | Mattison, Jr. | 297/352 |
| 6,364,391 | B1 | * | 4/2002 | Everett | 296/51 |
| 6,460,915 | B1 | * | 10/2002 | Bedi et al. | 296/183 |
| 6,460,922 | B1 | * | 10/2002 | Demick | 297/14 |

* cited by examiner

Primary Examiner—Greg Blankenship
(74) Attorney, Agent, or Firm—Fish and Richardson P.C.

(57) ABSTRACT

An accessory, such as a bench, is attached to a vehicle's tailgate. When the tailgate is in an open or down position, the accessory can be simply unfolded from the tailgate. The accessory may comprise a retractable folding bench that may be attached to the inside of the tailgate of a pick-up truck, sport utility vehicle, trailer or any vehicle equipped with a tailgate. The accessory may comprise a retractable folding bench that may be attached to the inside rear floor portion of a "sports utility vehicle" that has "barn doors" and are not equipped with a tailgate.

23 Claims, 6 Drawing Sheets

RETRACTABLE TAILGATE BENCH

BACKGROUND

1. Field of the Invention

The present invention relates to vehicle accessories. Specifically, the present invention relates to a retractable tailgate bench.

2. Description of the Related Art

Currently, vehicles equipped with tailgates offer no designed arrangement for seating except to sit on the tailgate when it is in the opened or down position.

SUMMARY OF THE INVENTION

The present invention relates to an accessory, such as a bench, that is attached to a vehicle's tailgate. When the tailgate is in an open or down position, the accessory can simply be unfolded from the tailgate. The accessory may comprise a retractable folding bench that may be attached to the inside of the tailgate of a pick-up truck, sport utility vehicle, trailer or any vehicle equipped with a tailgate. For vehicles such as "sport utility vehicles" with "barn doors," the accessory may be attached to the floor of the vehicle.

One embodiment of the retractable bench advantageously provides comfort and convenience to outdoor enthusiasts who utilize such vehicles for outdoor activities. Those activities that require a change of footwear such as skiing and motorcycling will greatly benefit from the convenience of the bench while changing into their boots. Others who will benefit from using the bench ranges from parents watching their children playing in little league games to hunters, campers, skiers, surfers, fishermen and bystanders, those viewing parades and scenery, or those enjoying tailgate parties or just simply relaxing. The retractable bench is especially advantageous for large vehicles, such as full sized pick-up trucks and SUVs (Ford F150s, Chevrolet Silverado, Dodge Ram, Suburbans and Expeditions) where an average person's feet and legs would dangle from an opened tailgate without the bench. The retractable bench provides comfort, easy access to the ground, lets the person rest their feet on the ground and provides a back support.

One aspect of the invention relates to a retractable bench mountable on a tailgate of a vehicle. The bench comprises a backrest coupled to at least one pivot mechanism. The pivot mechanism is attached to the tailgate. The pivot mechanism allows the backrest to pivot away from the tailgate. The bench further comprises a seat coupled to the backrest via a hinge. The hinge allows the seat to pivot away from the backrest.

Another aspect of the invention relates to a retractable bench mountable on a rear portion of a vehicle. The bench comprises a backrest coupled to at least one pivot mechanism. The pivot mechanism is attached to the rear portion of a vehicle. The pivot mechanism allows the backrest to pivot away from the rear portion of a vehicle. The bench further comprises a seat coupled to the backrest via a hinge. The hinge allows the seat to pivot away from the backrest.

DETAILED DESCRIPTION

Figure 1:
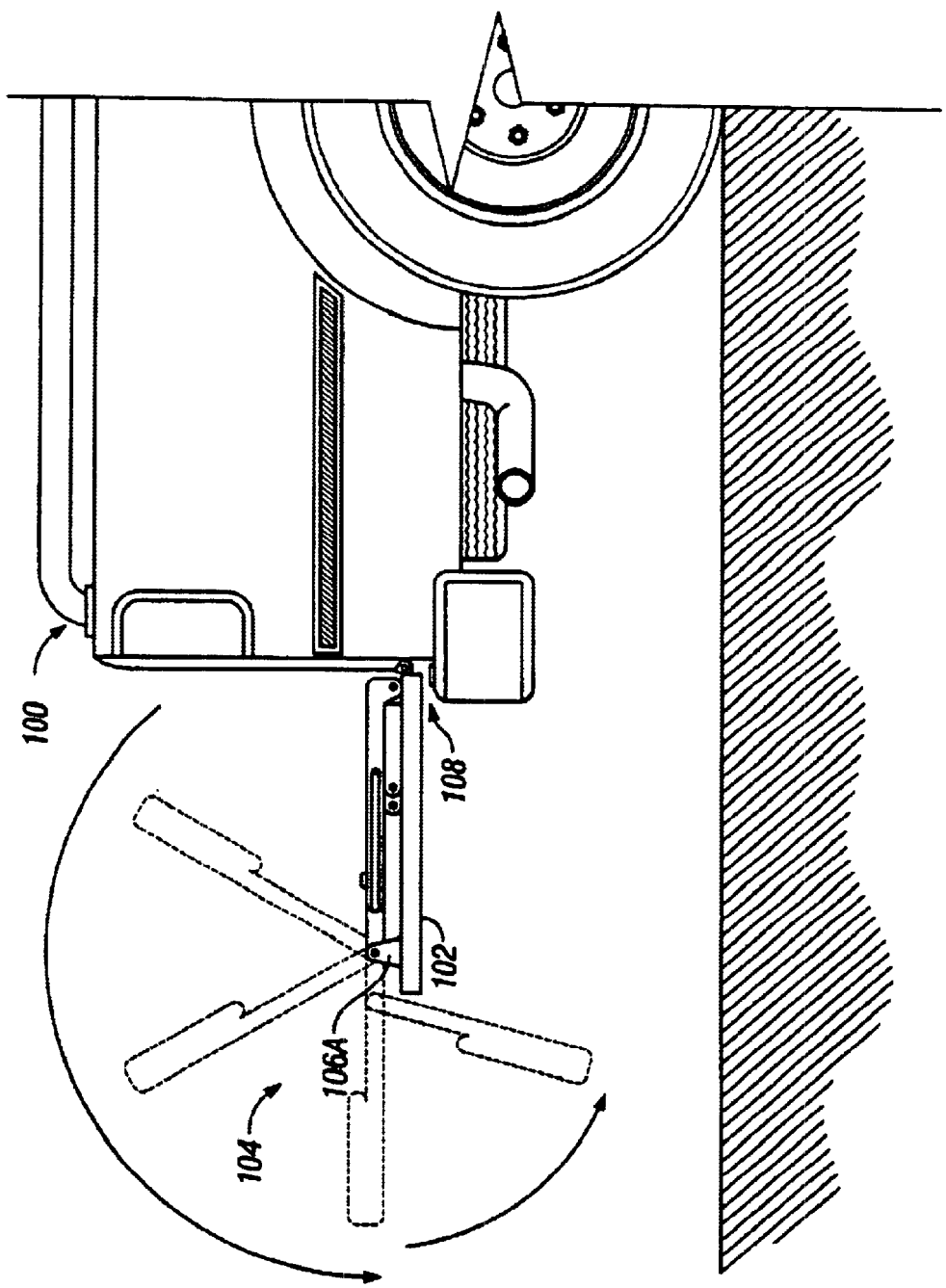
FIG. 1 is a side view of the back of a vehicle with a tailgate and one embodiment of a retractable folding bench.

FIG. 1 is a side view of the back of a vehicle 100 with a tailgate 102 and one embodiment of a retractable folding bench 104. The bench 104 may be attached to the inside of the tailgate 102 of a pick-up truck, sport utility vehicle, trailer or any vehicle equipped with a tailgate. When the tailgate 102 is in an open or down position as in FIG. 1, the bench 104 can be simply unfolded from the tailgate 102.

In one embodiment, the bench 104 may be completely set up in three easy steps. In a first retracted (original) position, the bench 104 is secured to the inside face of the tailgate 102 at three pivot points/hinges 106A–106C (only one pivot point 106A is shown in FIG. 1 but all three are shown in FIG. 4) on the upper portion of the tailgate 102. Although only three pivot points 106A–106C are shown in FIG. 4, any number of pivot points may be used in other configurations. For example, the bench 104 may have one long pivot hinge instead of three small pivot hinges.

As shown in FIG. 1, the bench 104 may be pulled upward from the lower or hinged area 108 of the tailgate 102, opposite of the pivot points/hinges 106A–106C, towards the operator.

Figure 2:
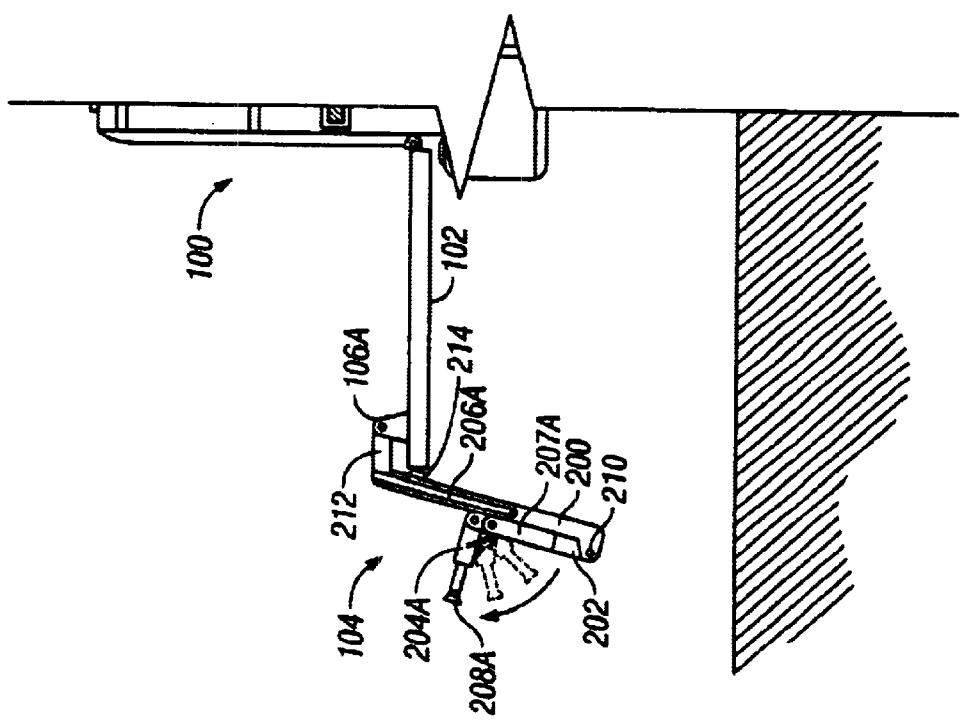
FIG. 2 illustrates the retractable bench of FIG. 1 in a partially retracted position.

FIG. 2 illustrates the bench 104 of FIG. 1 in a partially retracted position. In FIG. 2, each pivot point/hinge 106 is attached to a segment 212 that allows the bench 104 to extend beyond the tailgate 102 and down to nearly 260 degrees from the original retracted position. At that point, the hinges include one or more blocking mechanisms and/or bumpers 214 that maintain about an 80-degree angle upward from the ground in order to offer a comfortable angle for the backrest 200. In other embodiments, any desired angle may be implemented by the manufacturer or the operator. In other embodiments, any number and any configuration of hinges, segments, blocking mechanisms and pivot points may be implemented in accordance with the invention.

Figure 5:
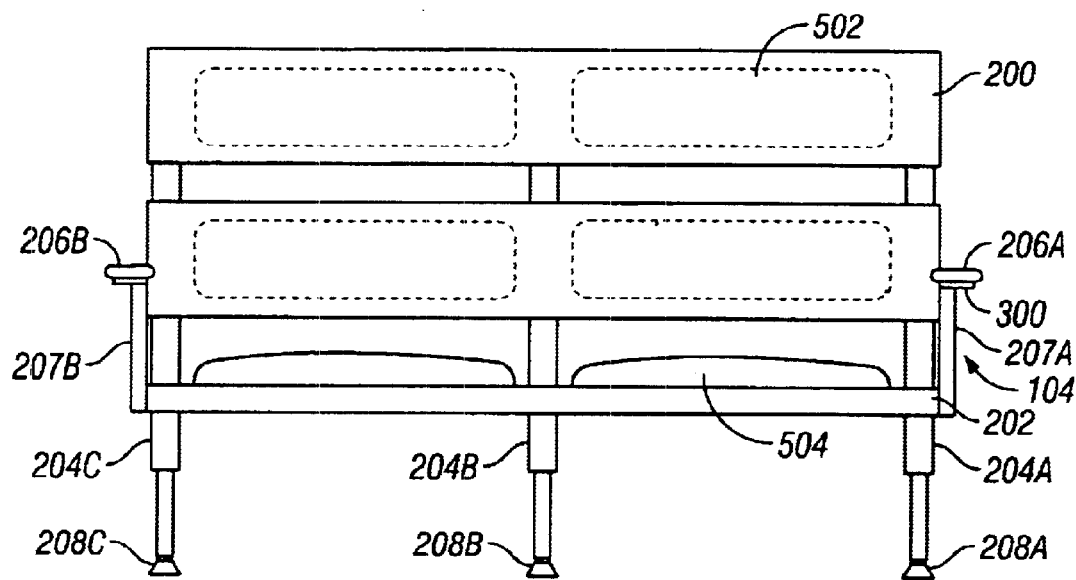
FIG. 5 is a front view of the retractable bench 104 of FIG. 1.

The second step is to swing out the three leg support pieces 204A–204C with swivel footpads 208A–208C (only one leg support piece 204A and one swivel footpad 208A is shown in FIG. 2, but all three pieces 204A–204C and footpads 208A–208C are shown in FIG. 5). The second step includes pulling the now exposed seating piece 202 of the bench 104 towards the operator and down. The seating piece 202 pivots with respect to the backrest 200 via a hinge/pivot point 210.

Figure 3:
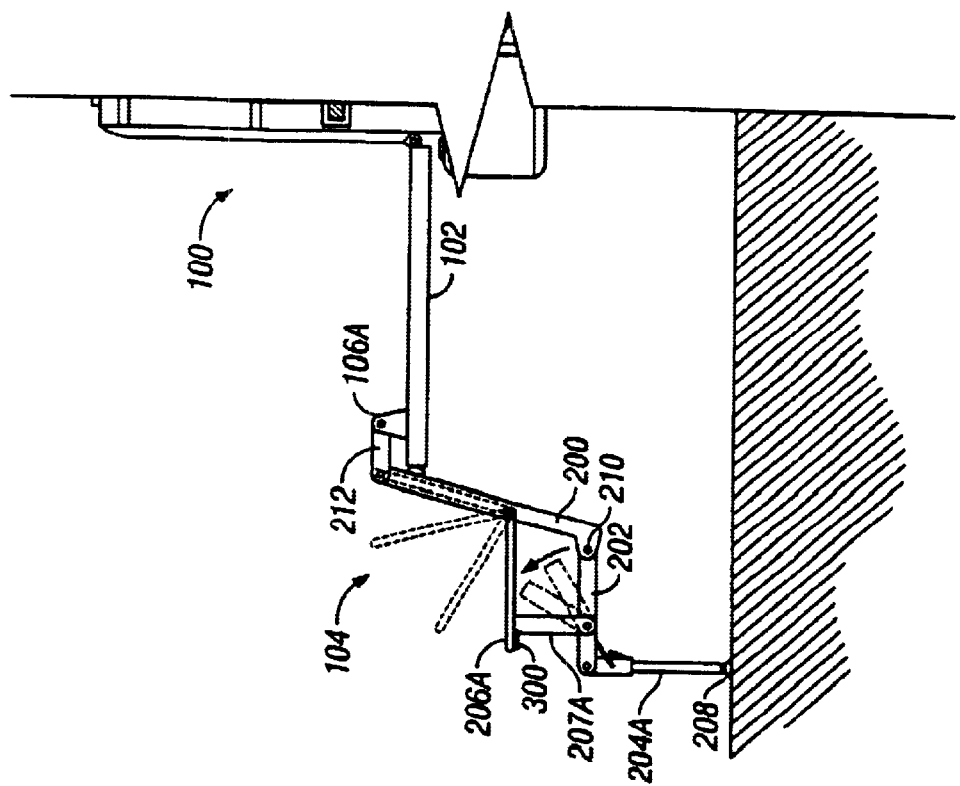
FIG. 3 illustrates the retractable bench of FIG. 1 in an extended position.

FIG. 3 illustrates the bench 104 of FIG. 1 in an extended position. The hinge/pivot point 210 allows the seat 202 of the bench 104 to be positioned substantially parallel with the ground (or any desired angle). Also, during this maneuver, the arm rests 206A, 206B and arm rest supports 207A, 207B of the bench 104 will unfold to their positions at both ends of the bench 104, as shown in FIGS. 3 and 5. In one embodiment, the arms 206A, 206B are equipped with cup holders 300.

The final step is to adjust the legs 204A, 204B of the bench 104 that were set in position during the second maneuver and are now pointing at the ground. Loosening a locking/tightening mechanism 400 (FIG. 4) will allow the telescopic legs 402 to slide out and the footpads 208 to make contact with the ground. Once the legs 402 are in a desired position or extended to a desired length, the locking mechanism 400 will be tightened, and the legs 402 will be able to support the bench 104 and the occupants.

Figure 4A:
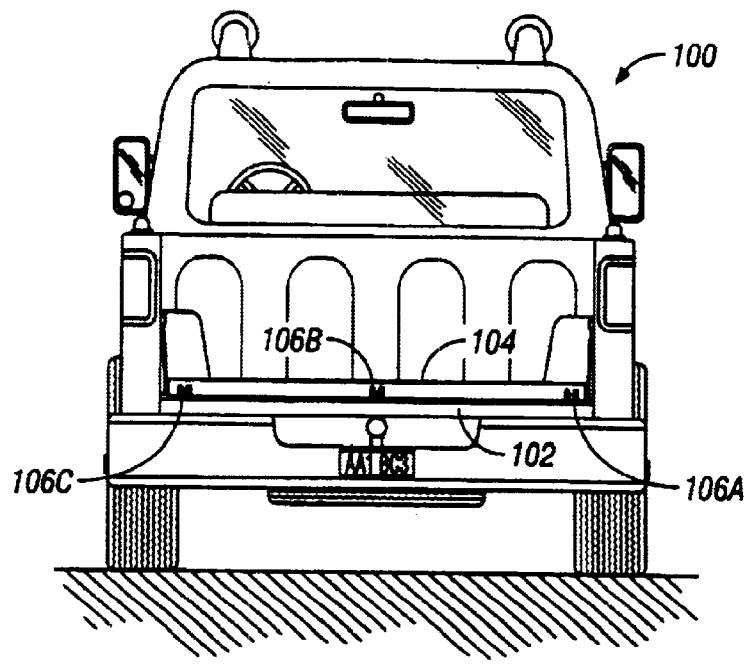
FIGS. 4A–4E illustrate various views and portions of the retractable bench of FIG. 1.

FIGS. 4A–4E illustrate various views and portions of the retractable bench 104 of FIG. 1. FIG. 4A illustrates the retracted bench 104 from the rear of the vehicle 100.

Figure 4B:
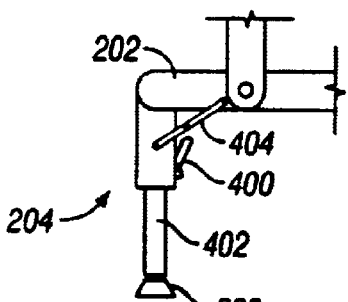

FIG. 4B illustrates the seat 202, a locking hinge 404, an upper leg piece 204, a tightening/locking mechanism 400, a lower telescopic leg piece 402 and a foot pad 208. The locking hinge 404 may hold the legs 204 in a desired position. The tightening mechanism 400 may have a quick release for the telescopic leg 402. The tightening mechanism 400 may be similar to locking units on bicycle seat ports and razor scooters. The footpads 208 may be on a swivel to adapt to uneven surfaces.

Figure 4D:
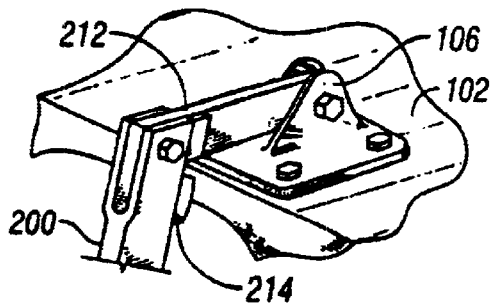
Figure 4C:
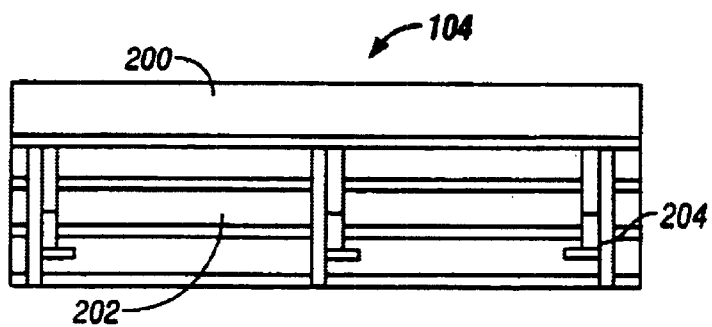

FIG. 4C is a top view of the bench 104 in a retracted position.

FIG. 4D illustrates a pivot point/hinge 106 between the tailgate 102 and the backrest 200. The backrest 200 may comprise a "Y" shaped frame support attached to the hinge. The backrest 200 may comprise aluminum pieces that are welded to create stops and a rubber bumper 214 to protect the tailgate 102.

Figure 4E:
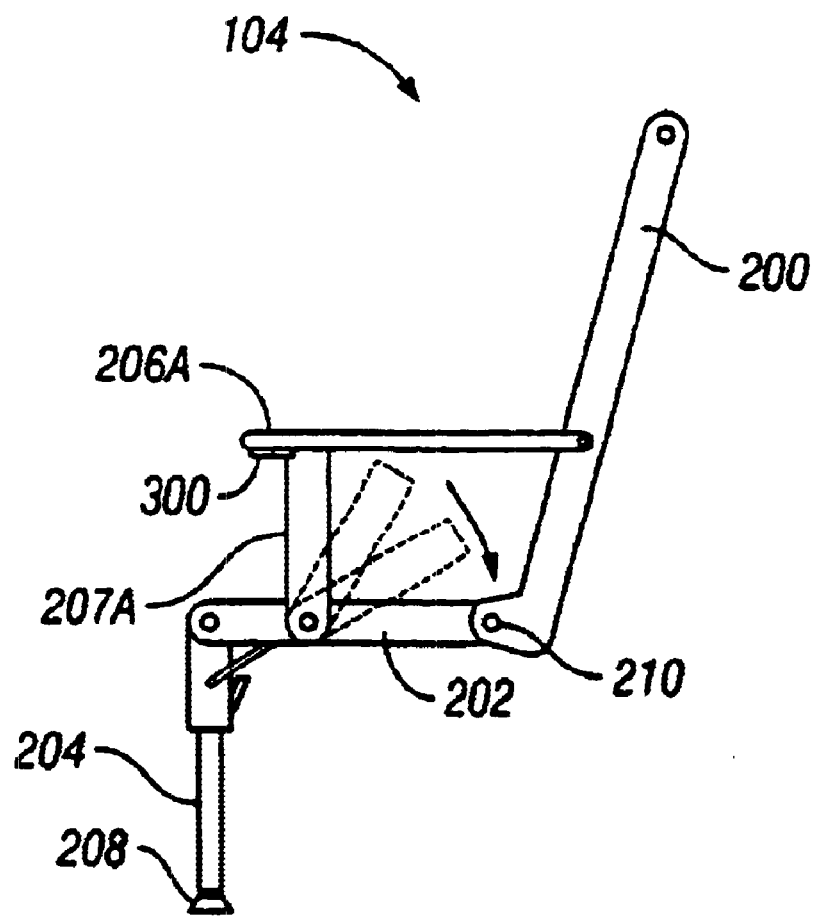

FIG. 4E is a side view of the bench 104 with a cupholder 300, an arm rest 206A that pivots to a substantially parallel position with the seat 202 and an arm rest support 207A that pivots to a position almost parallel with the backrest 200.

FIG. 5 is a front view of the retractable bench 104 of FIG. 1.

In other embodiments, the seating area 202 and/or backrest 200 may comprise lightweight aluminum, fiberglass, plastic, padded cushions 502, 504 (FIG. 5) or a combination of the above.

Figure 6A:
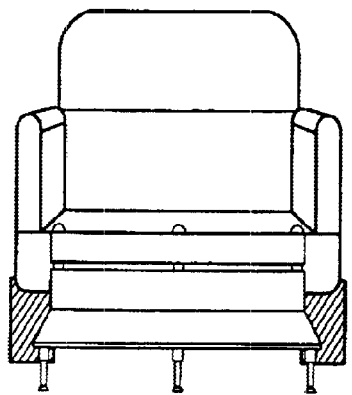
FIGS. 6A–6B illustrates a retractable bench attached to the rear floor of a vehicle.
Figure 6B:
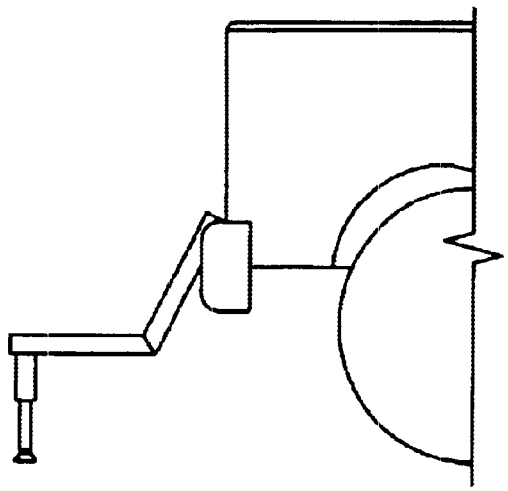
Figure 7:
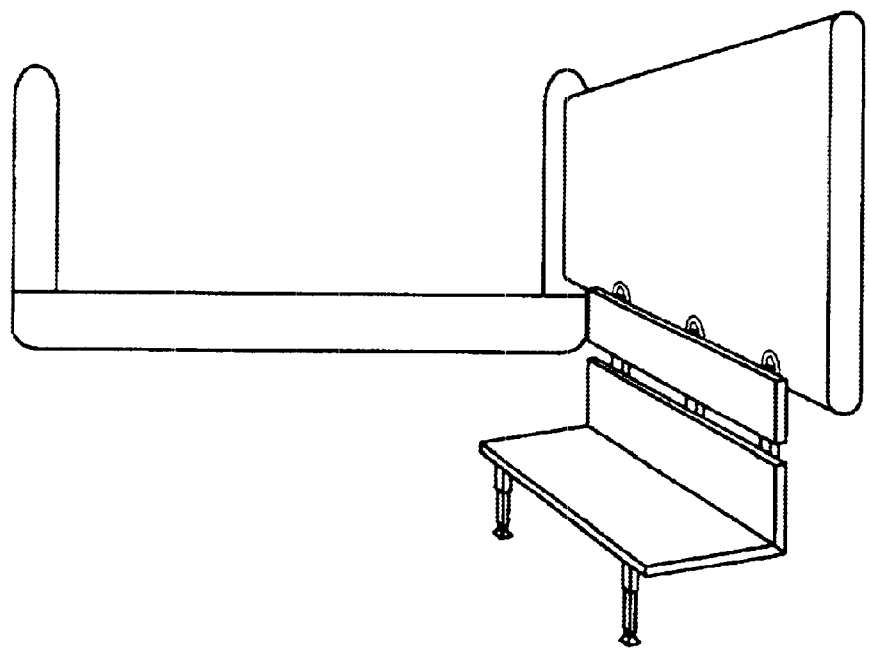
FIG. 7 illustrates a retractable bench that is mountable on a tailgate that swings horizontally away from the vehicle.

The invention described above may be implemented on the floor of a vehicle, as shown in FIGS. 6A–6B, where the doors swings out vertically or horizontally instead of swinging down. FIG. 7 illustrates a retractable bench that is mountable on a tailgate that swings horizontally away from the vehicle. Alternatively, the retractable bench may be mounted on a rear portion of a vehicle, where the bench may be extended after a tailgate or rear door is opened.

The above-described embodiments of the present invention are merely meant to be illustrative and not limiting. Various changes and modifications may be made without departing from the invention in its broader aspects. The appended claims encompass such changes and modifications within the spirit and scope of the invention.

What is claimed is:

1. A retractable bench mountable on a tailgate of a vehicle, the bench comprising:
    a backrest coupled to at least one pivot mechanism, the pivot mechanism being attached to the tailgate, the pivot mechanism allowing the backrest to pivot away from the tailgate, wherein the backrest comprises a frame and a substantially flat panel piece attached to the frame; and
    a seat coupled to the backrest via a hinge, the hinge allowing the seat to pivot away from the backrest.

2. The retractable bench of claim 1, wherein the pivot mechanism comprises a hinge that is secured to the tailgate by a plurality of screws.

3. The retractable bench of claim 2, wherein the pivot mechanism comprises a segment coupled to the hinge and the backrest.

4. The retractable bench of claim 1, wherein the backrest and the seat are substantially parallel to the tailgate in a retracted position.

5. A retractable bench mountable on a tailgate of a vehicle, the bench comprising:
    a backrest coupled to at least one pivot mechanism, the pivot mechanism being attached to the tailgate, the pivot mechanism allowing the backrest to pivot away from the tailgate;
    a seat coupled to the backrest via a hinge, the hinge allowing the seat to pivot away from the backrest; and
    a bumper attached to the backrest, the bumper configured to position the backrest at a desired angle with respect to the tailgate.

6. The retractable bench of claim 1, wherein the bench comprises lightweight aluminum tubing.

7. The retractable bench of claim 1, wherein the bench comprises fiberglass.

8. The retractable bench of claim 1, wherein the bench comprises wood.

9. The retractable bench of claim 1, wherein the bench comprises plastic.

10. A retractable bench mountable on a tailgate of a vehicle, the bench comprising:
    a backrest coupled to at least one pivot mechanism, the pivot mechanism being attached to the tailgate, the pivot mechanism allowing the backrest to pivot away from the tailgate; and
    a seat coupled to the backrest via a hinge, the hinge allowing the seat to pivot away from the backrest;
    wherein the bench comprises pads.

11. The retractable bench of claim 1, wherein the backrest and seat each comprises substantially flat lateral pieces secured by screws and rivets to a frame.

12. A retractable bench mountable on a tailgate of a vehicle, the bench comprising:
    a backrest coupled to at least one pivot mechanism, the pivot mechanism being attached to the tailgate, the pivot mechanism allowing the backrest to pivot away from the tailgate;
    a seat coupled to the backrest via a hinge, the hinge allowing the seat to pivot away from the backrest;
    an arm rest coupled to the backrest; and
    an arm rest support coupled to the arm rest and the seat, wherein the arm rest provides an arm rest when the bench is extended and folds substantially parallel to the backrest when the bench is retracted.

13. The retractable bench of claim 12, further comprising a cup holder attached to the arm rest.

14. A retractable bench mountable on a tailgate of a vehicle, the bench comprising:
    a backrest coupled to at least one pivot mechanism, the pivot mechanism being attached to the tailgate, the pivot mechanism allowing the backrest to pivot away from the tailgate;
    a seat coupled to the backrest via a hinge, the hinge allowing the seat to pivot away from the backrest;
    at least one retractable leg attached to the seat via a second hinge, the leg being configured to contact the ground when the bench is extended.

15. The retractable bench of claim 14, wherein the leg comprises:
    a first tubular piece attached to the seat;
    a second tubular piece with a slightly smaller circumference than the first tubular piece in order to fit inside the first tubular piece and act as a telescopic leg; and
    a locking mechanism to secure a position of the second tubular piece.

16. The retractable bench of claim 14, further comprising a footpad coupled to an end of the leg, the footpad comprising an oval metal section with an attached rubber pad.

17. The retractable bench of claim 14, further comprising a footpad coupled to an end of the leg via a swivel which allows the footpad to compensate for uneven surfaces.

18. The retractable bench of claim 14, further comprising a locking hinge coupled to the seat and the leg, the locking hinge operable to position the leg.

19. The retractable bench of claim 1, wherein the retractable bench is mountable on a tailgate that swings down and away from the vehicle.

20. The retractable bench of claim 1, wherein the retractable bench is mountable on a tailgate that swings horizontally away from the vehicle.

21. The retractable bench of claim 1, wherein the backrest and seat are sized to allow a person to sit in the seat with the person's feet on the ground.

22. The retractable bench of claim 1, wherein the backrest and pivot mechanism are configured to allow the backrest to extend to an angle of about 80 degrees with respect to the ground.

23. A retractable bench mountable on a floor of a vehicle, the bench comprising:
    a backrest coupled to at least one pivot mechanism, the pivot mechanism being attached to the floor of the vehicle, the pivot mechanism allowing the backrest to pivot away from the floor of the vehicle, wherein the backrest comprises a frame and a substantially flat panel piece attached to the frame; and
    a seat coupled to the backrest via a hinge, the hinge allowing the seat to pivot away from the backrest.

* * * * *